(12) United States Patent
Hua et al.

(10) Patent No.: US 7,936,906 B2
(45) Date of Patent: May 3, 2011

(54) FACE RECOGNITION USING DISCRIMINATIVELY TRAINED ORTHOGONAL TENSOR PROJECTIONS

(75) Inventors: Gang Hua, Redmond, WA (US); Paul A Viola, Seattle, WA (US); Steven M. Drucker, Bellevue, WA (US); Michael Revow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/763,909

(22) Filed: Jun. 15, 2007

(65) Prior Publication Data

US 2008/0310687 A1  Dec. 18, 2008

(51) Int. Cl.
*G06K 9/00* (2006.01)
(52) U.S. Cl. ........ 382/118; 382/155; 382/159; 382/181; 382/190
(58) Field of Classification Search .................. 382/118, 382/155, 159, 181, 190
See application file for complete search history.

(56) References Cited

U.S. PATENT DOCUMENTS

| | | | |
|---|---|---|---|
| 4,790,024 A | 12/1988 | Peppers et al. | |
| 5,754,681 A | 5/1998 | Watanabe et al. | |
| 5,901,244 A | 5/1999 | Souma et al. | |
| 6,441,821 B1 | 8/2002 | Nagasawa | |
| 6,876,755 B1* | 4/2005 | Taylor et al. | 382/115 |
| 7,027,620 B2 | 4/2006 | Martinez | |
| 7,715,597 B2* | 5/2010 | Costache et al. | 382/118 |
| 2005/0105779 A1 | 5/2005 | Kamei | |
| 2005/0123202 A1 | 6/2005 | Hwang et al. | |
| 2006/0034517 A1 | 2/2006 | Bober et al. | |
| 2007/0177805 A1* | 8/2007 | Gallagher | 382/190 |
| 2008/0014563 A1* | 1/2008 | Visani et al. | 434/155 |
| 2009/0074259 A1* | 3/2009 | Baltatu et al. | 382/118 |

FOREIGN PATENT DOCUMENTS

WO   WO03088131 A2   10/2003

OTHER PUBLICATIONS

Hwann-Tzong Chen, Tyng-Luh Liu, Chiou-Shann Fuh, "Learning Effective Image Metrics from Few Pairwise Examples," iccv, vol. 2, pp. 1371-1378, Tenth IEEE International Conference on Computer Vision (ICCV'05) vol. 2, Oct. 2005.*
Dong Xu; Lin, S.; Shuicheng Yan; Xiaoou Tang; University of Science and Technology of China "Rank-one Projections with Adaptive Margins for Face Recognition" Computer Vision and Pattern Recognition, 2006 IEEE Computer Society Conference on, ISSN: 1063-6919 , Jun. 17-22, 2006.*

(Continued)

*Primary Examiner* — Aaron W Carter
*Assistant Examiner* — Stephen R Koziol
(74) *Attorney, Agent, or Firm* — Lee & Hayes, PLLC

(57) ABSTRACT

Systems and methods are described for face recognition using discriminatively trained orthogonal rank one tensor projections. In an exemplary system, images are treated as tensors, rather than as conventional vectors of pixels. During runtime, the system designs visual features—embodied as tensor projections—that minimize intraclass differences between instances of the same face while maximizing interclass differences between the face and faces of different people. Tensor projections are pursued sequentially over a training set of images and take the form of a rank one tensor, i.e., the outer product of a set of vectors. An exemplary technique ensures that the tensor projections are orthogonal to one another, thereby increasing ability to generalize and discriminate image features over conventional techniques. Orthogonality among tensor projections is maintained by iteratively solving an ortho-constrained eigenvalue problem in one dimension of a tensor while solving unconstrained eigenvalue problems in additional dimensions of the tensor.

20 Claims, 6 Drawing Sheets

OTHER PUBLICATIONS

Chopra, et al., "Learning a Similarity Metric Discriminatively, with Application to Face Verification", available at least as early as Apr. 23, 2007, at <<http://www.cs.toronto.edu/~hinton/csc2535/readings/chopra-05.pdf>>, pp. 1-8.

Shashua, et al., "Linear Image Coding for Regression and Classification using the Tensor-rank Principle", available at least as early as Apr. 23, 2007, at <<http://www.cs.huji.ac.il/~alevin/papers/rank1-cvpr01.ps>>, pp. 1-8.

Xu, et al., "Rank-one Projections with Adaptive Margins for Face Recognition", retrieved on Apr. 24, 2007, at <<http://csdl2.computer.org/persagen/DLAbsToc.jsp?resourcePath=/dl/proceedings/&toc=comp/proceedings/cvpr/2006/2597/01/2597toc.xml&DOI=10.1109/CVPR.2006.234>>, IEEE, vol. 1, 2006, pp. 1-2.

Yan, et al., "Discriminant Analysis with Tensor Representation", available at least as early as Apr. 23, 2007, at <<http://research.microsoft.com/users/leizhang/Paper/CVPR05-Shuicheng-Discriminant.pdf>>, IEEE, 2005, pp. 1-7.

* cited by examiner

FACE RECOGNITION USING DISCRIMINATIVELY TRAINED ORTHOGONAL TENSOR PROJECTIONS

BACKGROUND

Appearance-based face recognition is often formulated as a problem of comparing labeled example images with unlabeled probe images. Viewed in terms of conventional machine learning, the dimensionality of the data is very high, the number of examples is very small, and the data is corrupted with large confounding influences such as changes in lighting and pose. As a result, conventional techniques such as nearest neighbor classification are not very effective.

A predominant conventional solution is to find a projective embedding of the original data into a lower dimensional space that preserves discriminant information and discards confounding information. These conventional solutions must address three challenges: high dimensionality, learning capacity, and generalization ability. Learning capacity, sometimes called inductive bias or discriminant ability, is the capacity of an algorithm to represent arbitrary class boundaries. Generalization ability is a measure of the expected errors on data outside of the training set, e.g., as measured by classification margin. While tradeoffs of these factors apply in any practical machine learning approach, face recognition presents extreme challenges.

The conventional face recognition technologies can be categorized into two classes: biometric-based methods and learning-based methods. The biometric-based methods match invariant geometrical facial metrics such as the relative distances between the eyes and nose. Learning-based methods use machine learning techniques to extract discriminant facial features for recognition.

In general, complex models with more parameters (e.g., neural networks) have higher learning capacity but are prone to over-fit and thus have low generalization ability. When available, a large quantity of diversified training data can be used to better constrain the parameters. Simpler models with fewer parameters tend to yield better generalization, but have limited learning capacity. The tradeoff in implementing these issues, especially with high dimensional visual data, remains an open issue.

Many discriminant learning methods treat image data as vectors. These approaches have difficulty with high dimensionality, a matter made worse when there is only a small set of training data. Many conventional methods involve solving an eigenvalue problem in the high dimensional input vector space (i.e., 1024 dimensions for 32×32 pixel images). Solving an Eigen decomposition in high dimensions is not only computationally intensive, but also prone to numerical difficulties in which the best discriminative projections may be discarded. Vector-based representations also ignore the spatial structure of image data which may be very useful for visual recognition.

SUMMARY

Systems and methods are described for face recognition using discriminatively trained orthogonal rank one tensor projections. In an exemplary system, images are treated as tensors, rather than as conventional vectors of pixels. During runtime, the system designs visual features—embodied as tensor projections—that minimize intraclass differences between instances of the same face while maximizing interclass differences between the face and faces of different people. Tensor projections are pursued sequentially over a training set of images and take the form of a rank one tensor, i.e., the outer product of a set of vectors. An exemplary technique ensures that the tensor projections are orthogonal to one another, thereby increasing ability to generalize and discriminate image features over conventional techniques. Orthogonality among tensor projections is maintained by iteratively solving an ortho-constrained eigenvalue problem in one dimension of a tensor while solving unconstrained eigenvalue problems in additional dimensions of the tensor.

This summary is provided to introduce the subject matter of for face recognition using discriminatively trained orthogonal rank one tensor projections, which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for face recognition using discriminatively trained orthogonal rank one tensor projections. Exemplary systems base face recognition on discriminative linear projection. In the exemplary system, images are treated as tensors, rather than as conventional vectors of pixels. A tensor can be considered a multi-dimensional array, which for purposes of face recognition is utilized herein to exploit untapped information of high-dimensionality that is inherent in an image. In an exemplary system, an extracted series of orthogonal rank one tensor projections maximizes discriminative information for recognizing faces.

In one implementation, projections are pursued sequentially in the form of a rank one tensor, i.e., a tensor which is the outer product of a set of vectors. An exemplary method effectively ensures that the rank one tensor projections are orthogonal to one another. The orthogonality constraints on the tensor projections provide a strong inductive bias and result in better generalization on small training sets. That is, the orthogonality increases the ability of the exemplary system to generalize relevant image features for recognizing a face (e.g., that changes somewhat across multiple images) while at the same time also increases the ability of the system to discriminate between visual nuances.

In one implementation, the exemplary system achieves orthogonal rank one projections by pursing consecutive projections in the complement space of previous projections. Although consecutive projections may be conventionally meaningful for applications such as image reconstruction, they may be less meaningful for pursuing discriminant projections. However, the exemplary system achieves the consecutive projections, as described in greater detail below, by iteratively solving an eigenvalue problem with orthogonality constraints on one tensor dimension, while solving unconstrained eigenvalue problems on the other dimensions.

Experiments demonstrate that on small and medium-sized face recognition datasets, the exemplary system utilizing the exemplary orthogonality technique outperforms previous conventional embedding methods. On large face datasets the exemplary system achieves results comparable with the best conventional techniques while often using fewer discriminant projections.

Exemplary System

Figure 1:
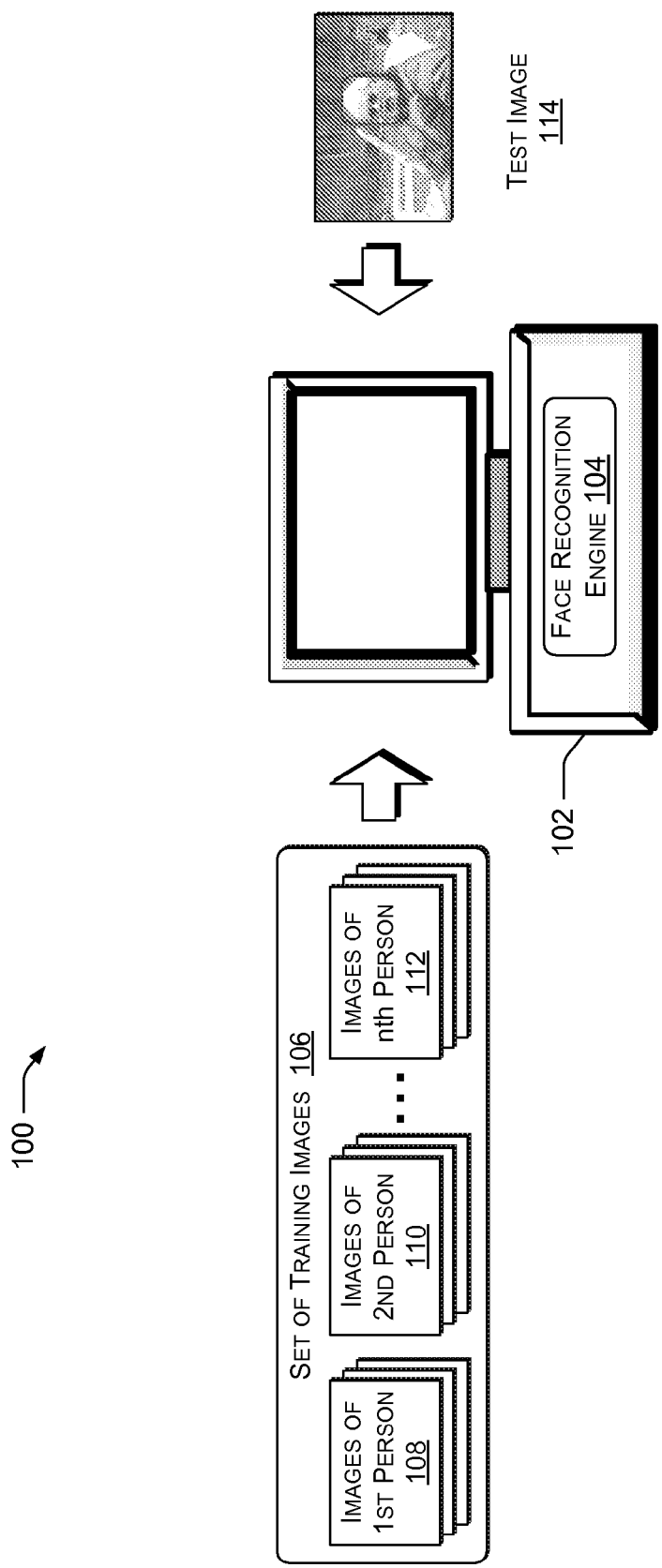
FIG. 1 is a diagram of an exemplary face recognition system.

FIG. 1 shows an exemplary system 100 for performing face recognition using discriminatively trained orthogonal tensor projections. A computing device 102 hosts an exemplary face recognition engine 104. The face recognition engine 104 learns a set of orthogonal rank one tensor projections from a set of training images 106. The set of training images 106 includes multiple images of a first person 108, multiple images of a second person 110 . . . and multiple images of other people—to the "nth" person 112.

The set of orthogonal rank one tensor projects extracted from the set of training images 106 by the face recognition engine 104 depends on the actual faces portrayed in the images 106. That is, the face recognition engine 104 derives image features to be embodied in the orthogonal tensor projections from pixel-level and/or human perceptual level visual features, such that differences across multiple instances of a person's face in multiple images is minimized, while differences between that person's face and other faces (i.e., of other people) are maximized. Thus, the face recognition engine 104 performs an optimization that results in the "best discriminative" tensor projections being extracted. The discriminative quality of the tensor projections—the ability to recognize a face as belonging to a particular person—is greatly enhanced by the exemplary technique of maintaining the projections in the set of tensor projections as orthogonal (ortho-normal) to each other.

Once trained to a set of training images 106, the face recognition engine 104 can discriminate faces in test images 114 from different faces in other images, and can recognize a face that matches a known face in the training set 106.

Exemplary Engine

Figure 2:
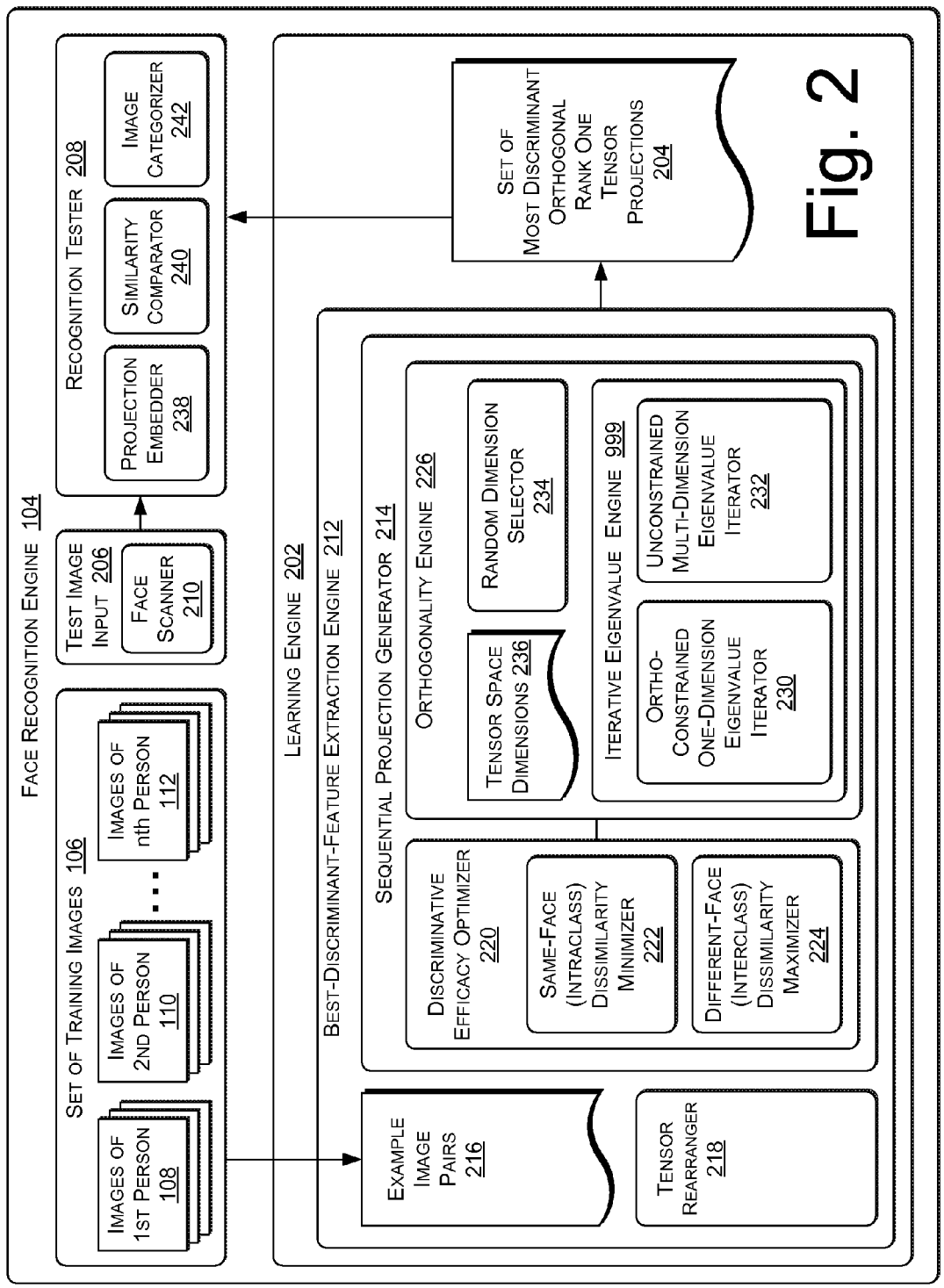
FIG. 2 is a block diagram of an exemplary face recognition engine.

FIG. 2 shows the face recognition engine 104 of FIG. 1 in greater detail. The illustrated implementation is only one example configuration, for descriptive purposes. Many other arrangements of the components of an exemplary face recognition engine 104 are possible within the scope of the subject matter. Such an exemplary face recognition engine 104 can be executed in hardware, software, or combinations of hardware, software, firmware, etc.

The illustrated face recognition engine 104 includes an input or access path to the set of training images 106 of FIG. 1. The face recognition engine 104 includes a learning engine 202, which extracts a set of "most discriminant" orthogonal rank one tensor projections 204 from the set of training images 106. The face recognition engine 104 further includes a test image input 206 and a recognition tester 208 to determine if a test image 114 is recognizable from the set of training images 106. The test image input 206 may retrieve a test image 114 input by a user, from a file, from the Internet, etc., for example the test image 114 may be an image search criterion for searching a vast database of stored images. Or, the test image 114 may be obtained by a camera or face scanner 210.

The learning engine 202 may further include a best-discriminant-feature extraction engine 212, which in turn includes a sequential projection generator 214 to learn the set of orthogonal tensor projections 204 from example image pairs 216. A tensor rearranger 218 may unfold or reconfigure the dimensionality of a given tensor to enable the sequential projection generator 214 to pursue a greater number of projections for the set of orthogonal tensor projections 204. For example, the tensor rearranger 218 may utilize or comprise a GLOCAL transform to reduce the number of dimensions needed to organize the same tensor data. (See, H.-T. Chen, T.-L. Liu, and C.-S. Fuh, "Learning effective image metrics from few pairwise examples," *IEEE ICCV*, pages 1371-1378, Beijing, China, October 2005, which is incorporated herein by reference.)

The sequential projection generator 214 may include a discriminative efficacy optimizer 220, including a "same-face" intraclass dissimilarity minimizer 222 and a "different-face" interclass dissimilarity maximizer 224. An associated orthogonality engine 226 includes an iterative eigenvalue engine 228 that effects an optimization which finds the most discriminant tensor projections 204 via an ortho-constrained one-dimension eigenvalue engine 230 and an unconstrained multi-dimension eigenvalue engine 232. A random dimension selector 234 chooses one dimension out of multiple tensor space dimensions 236 for the ortho-constrained one-dimension eigenvalue engine 230 to operate on. Then the unconstrained multi-dimension eigenvalue engine 232 operates on the remaining dimensions of the tensor space dimensions 236. Operation of the above components will be described in greater detail below.

The recognition tester 208 includes a projection embedder 238, a similarity comparator 240, and an image categorizer 242. The projection embedder 238 applies the set of orthogonal rank one tensor projections 204 to a test image 114, while the similarity comparator 240 decides whether the test image 114 matches a known image or another test image 114, and the image categorizer 242 classifies test images 114 according to recognized faces they may contain. Operation of the components just introduced will now be described.

Operation of the Exemplary Face Recognition Engine

Figure 3:
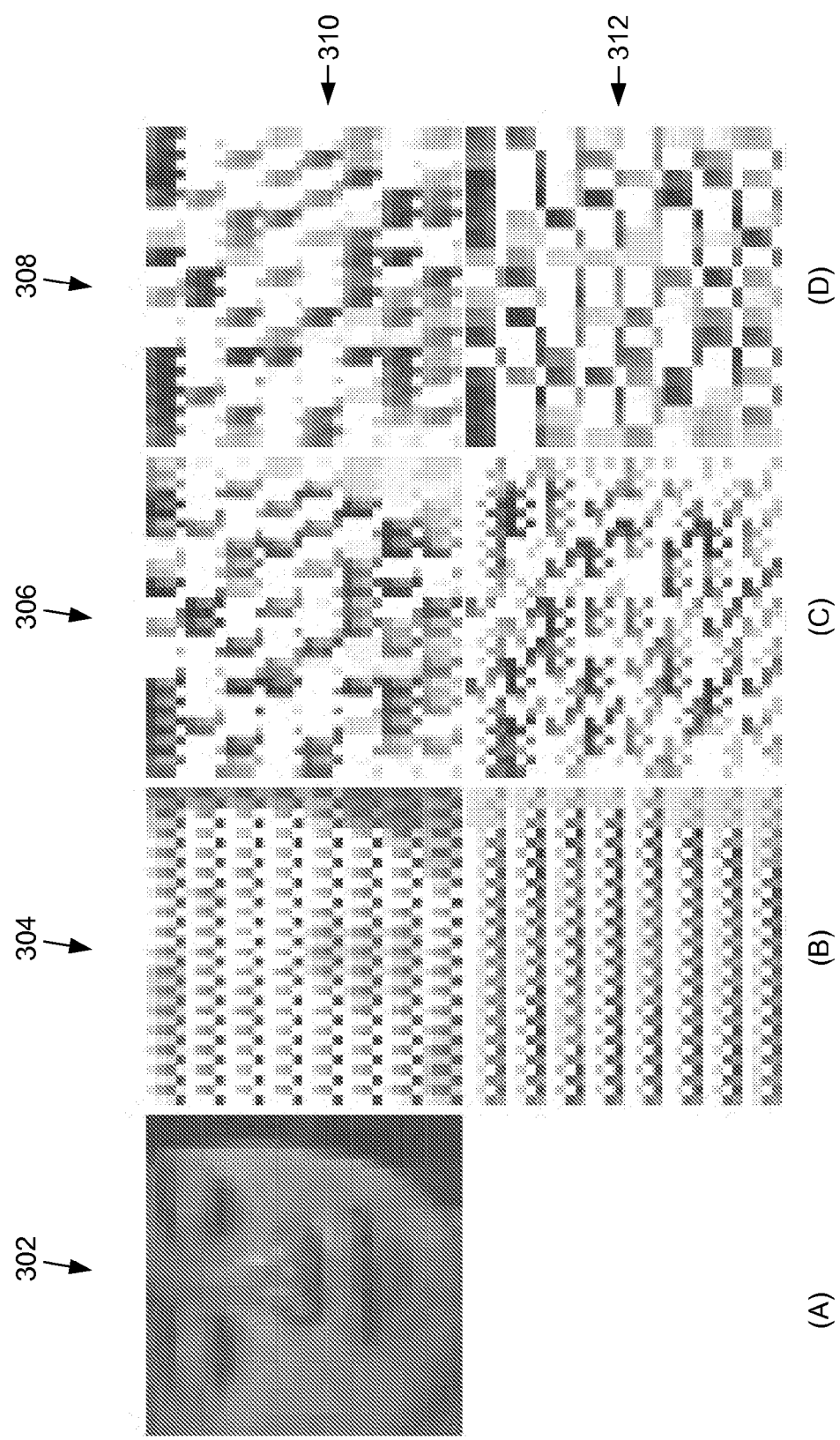
FIG. 3 is a diagram of an example visualization of a face represented as tensor projections.

The exemplary face recognition engine 104 regards image data as a tensor (i.e., a multiple dimensional array). FIG. 3 shows some aspects of representing an image as a tensor. For example, the tensor rearranger 218 may represent a tensor as a GLOCAL image with 4×2 blocks. Each row (e.g., 310 and 312) visualizes one rank one projection. The terms G(•) and IG(•) denote a GLOCAL transform and its inverse transform, respectively. FIG. 3(a) shows a source image "X" 302. For a 2-dimensional tensor, a rank one projection is defined with left and right projections "l" and "r." FIG. 3(b) shows a reconstructed left projection $IG(ll^T G(Y))$ 304; FIG. 3(c) shows a full bilinear projection $IG(l^T G(X)r)$ 306; and FIG. 3(d) shows a reconstructed right projection $IG(G(X)rr^T)$ 308.

Using tensor representation of image data, the best-discriminant-feature extraction engine 212 can pursue discriminant multilinear projections (e.g., bi-linear projections, for a 2-dimensional tensor) to construct discriminant embedding. In many cases, the sequential projection generator 214 obtains discriminant multi-linear projections by solving the eigenvalue problems iteratively on n different dimensions of the tensor space 236. The exemplary techniques described herein are different from conventional "rank one projections with adaptive margins" (RPAM). First, the rank one projections pursued by the exemplary face recognition engine 104 are orthogonal, while those learned from RPAM are not. Previous research has shown that orthogonality increases the discriminative power of the projections. Although in one implementation the face recognition engine 104 does not use adaptive margin, such could be easily incorporated into the exemplary system.

Tensor representations of images do not suffer from the same "curse-of-dimensionality" as vector space representations. Tensor projections are represented as the outer product of n lower dimensional vectors. For example, rather than expending 1024 parameters for each projection, 2-dimensional tensors can operate with as few as 64 parameters per projection. As discussed below, a tensor rearranger 218, e.g., utilizing a GLOCAL tensor representation, has the added benefit of respecting the geometric structure inherent in images.

Most previous tensor-based learning methods for discriminant embedding constrain the spanning set of multi-linear projections that are to be formed by combination of outer products of a small number of column vectors. This may over-constrain the learning capacity of the projection vectors.

The exemplary face recognition engine 104 addresses the conflicting goals of capacity and generalization by learning a projection which is a combination of orthogonal rank one tensors. It is worth noting that two rank one tensors are orthogonal if and only if they are orthogonal on at least one dimension of the tensor space. The exemplary orthogonality engine 226 uses this insight in achieving orthogonality among projections. The iterative eigenvalue engine 228 iteratively solves an eigenvalue problem with orthogonality constraints on one dimension, and solves unconstrained eigenvalue problems on the other dimensions of the tensor space 236.

Rank One Projection and Orthogonality

In linear algebra, an order n real-valued tensor is a multiple dimensional array $X \in R^{m_0 \times m_1 \cdots \times m_{n-1}}$ and $X_{i_0 i_1 \ldots i_{n-1}}$ is the element at position $(i_0, i_1, \ldots i_{n-1})$. Next . . . , a rank one projection is defined.

Definition: Given an order n tensor X, a rank one projection is a $X \in R^{m_0 \times m_1 \cdots \times m_n} \to y \in R$ mapping defined by $\tilde{P} = \{p_0, p_1, \ldots, p_{n-1}\}$ where each $p_i$ is a column vector of dimension $m_i$ with the $k^{th}$ element $P_{ik}$, such that in Equation (1):

$$y = \sum_{i_{n-1}} \cdots \left( \sum_{i_1} \left( \sum_{i_0} x_{i_0 i_1 \ldots i_{n-1}} p_{0 i_0} \right) p_{1 i_1} \cdots \right) p_{n-1 i_{n-1}}. \quad (1)$$

The notation can be simplified using a k-mode product, i.e.:

Definition: The k-mode product of tensor $X \in R^{m_0 \times m_k \cdots \times m_{n-1}}$ and a matrix (i.e., an order 2 tensor) $B \in R^{m_k \times m'_k}$ is a $X \in R^{m_0 \times \cdots m_k \times \cdots \times m_{n-1}} \to Y \in R^{m_0 \times \cdots m'_k \times \cdots \times m_{n-1}}$ mapping, i.e., $Y = X \times_k B$, where, as shown in Equation (2):

$$y_{i_0 \ldots i_{k-1} i'_k i_{k+1} \ldots i_n} = \sum_{j=0}^{m_k - 1} x_{i_0 \ldots i_{k-1} j i_{k+1} \ldots i_{n-1}} b_{j i'_k} \quad (2)$$

Equation (1) can then be written as $y = X \times_0 p_0 \times_{n-1} p_{n-1}$, or in short $y = X \Theta \tilde{P}$. Let $\tilde{P}^d = \{\tilde{P}^{(0)}, \ldots, \tilde{P}^{(d-1)}\}$ be a set of d rank one projections, then the mapping from X to $y = [y_0, y_1, \ldots, y_{d-1}]^T \in R^d$ is denoted as in Equation (3):

$$y = [X \Theta \tilde{P}^{(0)}, \ldots, X \Theta \tilde{P}^{(d-1)}]^T \underline{\Delta} X \Theta \tilde{\tilde{P}} \quad (3)$$

A rank one projection is also the sum of element-wise product of X and the reconstruction tensor of $\tilde{P}$.

Definition: The reconstruction tensor of $\tilde{P}$ is $P' \in R^{m_0 \times m_2 \cdots \times m_{n-1}}$ such that, as in Equation (4):

$$P' = [p'_{i_0 i_1 \ldots i_{n-1}}] = \left[ \prod_{k=0}^{n-1} p_{k i_0} \right] \quad (4)$$

Then $y = X \Theta \tilde{P} = \Sigma_{i_0 i_1 \ldots i_{n-1}} x_{i_0 i_1 \ldots i_{n-1}} p'_{i_0 i_1 \ldots i_{n-1}}$. An order n rank one projection is indeed a constrained vector space linear projection $x \in R^{\Pi_i m_i} \to y \in R$ such that $y = \hat{p}^T x$, where x is the vector scanned dimension-by-dimension from X, and $\hat{p}$ is defined as in Equation (5):

$$\hat{p} = p_{n-1} \otimes p_{n-2} \otimes p_0 \quad (5)$$

Where $\otimes$ is the Kronecker product of matrices. Next, the orthogonality of two rank one projections is defined, i.e.:

Definition: Two rank one projections $\tilde{P}^{(1)}$ and $\tilde{P}^{(2)}$ are orthogonal, if and only if the corresponding vectors $\tilde{P}_1$ and $\tilde{P}_2$ calculated from Equation (5) are orthogonal. Similarly, $\tilde{P}$ can be called a normal rank one projection if and only if $\hat{p}$ is a normal vector. If all $p_i$ of $\tilde{P}$ are normal vectors, then $\tilde{P}$ is a normal rank one projection.

Ortho Rank One Discriminant Analysis

Given a training set $\{X_i \in R^{m_0 \times m_1 \cdots \times m_{n-1}}\}_{i=0}^{N-1}$ 106 and set of pairwise labels $L = \{l(i,j): i<j; i,j \in \{0, \ldots, N-1\}\}$, where $l(i,j)=1$, if $X_i$ and $X_j$ are in the same category 242, and $l(i,j)=0$ otherwise. Let $\mathcal{N}_k(i)$ be the set of k-nearest neighbors of $X_i$, then:

$$D = \{(i,j) | i<j, l(i,j)=0, X_i \in \mathcal{N}_k(j) \| X_j \in \mathcal{N}_k(i)\}$$

$$S = \{(i,j) | i<j, l(i,j)=1, X_i \in \mathcal{N}_k(j) \| X_j \in \mathcal{N}_k(i)\}$$

are the indices set of all example pairs 216 which are k-nearest neighbors of one another, and are from different and same categories, respectively. The objective is to learn a set of K ortho-normal rank one projections $\tilde{P}^K = (\tilde{P}^{(0)}, \tilde{P}^{(1)}, \ldots, \tilde{P}^{(K-1)})$ such that in the projective embedding space, the distances of the example pairs 216 in $S$ (same face) are minimized, while the distances of the example pairs 216 in $\mathcal{D}$ (different faces) are maximized.

To achieve this, the sequential projection generator 214 maximizes a series of local weighted discriminant cost functions. Suppose the sequential projection generator 214 has obtained k discriminant rank one projections indexed from 0 to k−1, then to pursue the $(k+1)^{th}$ rank one projection, the sequential projection generator 214 solves the following constrained optimization problem in Equations (6) and (7):

$$\max_{\tilde{P}^{(k)}} \frac{\sum_D \omega_{ij} \| X_i \Theta \tilde{P}^{(k)} - X_j \Theta \tilde{P}^{(k)} \|^2}{\sum_S \omega_{ij} \| X_i \Theta \tilde{P}^{(k)} - X_j \Theta \tilde{P}^{(k)} \|^2} \quad (6)$$

s.t. $\tilde{P}^{(k)} \perp \tilde{P}^{(k-1)}, \ldots, \tilde{P}^{(k)} \perp \tilde{P}^{(0)}$ (7)

where $\|\cdot\|$ is the Euclidean distance, and $\omega_{ij}$ is a weight assigned according to the importance of the example pair $(X_i, X_j)$ 216. In one implementation, the heat kernel weight is used, i.e., $$\omega_{ij} = \exp\left\{ -\frac{\|X_i - X_j\|_F^2}{t} \right\} \text{ where } \|\cdot\|_F$$

denotes the Frobenius norm, and t is a constant parameter. The heat kernel weight introduces heavy penalties to the cost function for example pairs 216 that are close to one another. Notice that for k=0, only an unconstrained optimization problem of Equation (6) is solved.

There are two difficulties in the constrained maximization of Equation (6). First, it is generally difficult to maintain both the rank one and orthogonality properties. Second, there is no closed-form solution to the unconstrained optimization problem of Equation (6). It is well known that the second problem can be addressed numerically using a sequential, iterative optimization scheme. A solution to the first problem is described in the following section.

Exemplary Learning Engine

In one implementation, the exemplary learning engine 202 uses the following proposition:

Proposition: Two rank one projections $\tilde{P}^{(1)}$ and $\tilde{P}^{(2)}$ are orthogonal to each other, if and only if for at least one i, $p_i^{(1)} \in \tilde{P}^{(1)}$ is orthogonal to $p_i^{(2)} \in \tilde{P}^{(2)}$ i.e., $p_i^{(1)} \perp p_i^{(2)}$.

From this Proposition, an equivalent set of constraints of Equation (7) is given in Equation (8):

$$\exists \{j_l; l\epsilon\{0,\ldots,k-1\}; j_l\epsilon\{0,\ldots,n-1\}\}: \\ p_{j_{k-1}}^{(k)} \perp p_{j_{k-1}}^{(k-1)}, \ldots, p_{j_0}^{(k)} \perp p_{j_0}^{(0)}. \tag{8}$$

To make the optimization more tractable, the constraints on Equation (7) can be replaced with the following stronger constraints.

$$\exists j\epsilon\{0,\ldots,n-1\}: p_j^{(k)} \perp p_j^{(k-1)}, \ldots, p_j^{(k)} \perp p_j^{(0)}. \tag{9}$$

These constraints are stronger because they require all $j_l$ in Equation (8) to be the same. The constraints in Equation (9) are sufficient conditions for the constraints in Equation (7).

It is well known that the unconstrained problem in Equation (6) can be solved numerically in a sequentially iterative manner. That is, at each iteration, the iterative eigenvalue engine 228 fixes $\tilde{P}_{\bar{i}}^{(k)} = \{p_0^{(k)}, \ldots, p_{i-1}^{(k)}, p_{i+1}^{(k)}, \ldots, p_{n-1}^{(k)}\}$ for one $i\epsilon\{0, \ldots, n-1\}$, and maximizes Equation (6) with respect to $p_i^{(k)}$. To simplify notation, Equation (10) denotes:

$$y^{(k)} = X \times_0 p_0^{(k)} \ldots \times_{i-1} p_{i-1}^{(k)} \times_{i+1} p_{i+1}^{(k)} \ldots p_{n-1}^{(k)} \\ \underline{\Delta X \Theta \tilde{P}_{\bar{i}}^{(k)}} \tag{10}$$

which is a $m_i$ dimensional vector. Then Equation (11) is to be solved:

$$\max_p \frac{p^T A_d^{(i)} p}{p^T A_s^{(i)} p} \tag{11}$$

where, in Equations (12), (13), and (14):

$$A_d^{(i)} = \sum_D \omega_{op} (y_0^{(k)} - y_p^{(k)})(y_0^{(k)} - y_p^{(k)})^T \tag{12}$$

$$A_s^{(i)} = \sum_S \omega_{op} (y_0^{(k)} - y_p^{(k)})(y_0^{(k)} - y_p^{(k)})^T \tag{13}$$

$$y_0^{(k)} = X_o \Theta \tilde{P}_{\bar{i}}^{(k)}, \quad o = 1, \ldots, N \tag{14}$$

The iterative eigenvalue engine 228 obtains the optimal solution of Equation (11) by solving the generalized eigenvalue problem in Equation (15):

$$A_d^{(i)} p = \lambda A_s^{(i)} p, \tag{15}$$

and the optimal solution $p_i^{(k)*}$ is the eigenvector associated with the largest eigenvalue. Equation (15) is solved iteratively over i=1, 2, ..., n one-by-one until convergence. The final output $\tilde{P}^{(k)*} = \{p_0^{(k)*}, p_1^{(k)*}, \ldots, p_n^{(k)*}\}$ is regarded as the optimal solution to the unconstrained Equation (6). This iterative technique can only guarantee a locally optimal solution.

To solve Equation (6) with the constraints in Equation (9), suppose j have been selected, the iteration steps to optimize those $P_i^{(k)}$ where $i \neq j$ should remain unchanged since the constraints do not apply to them.

Now Equation (11) is to be solved for i=j, such that the constraints in Equation (9) hold. It is equivalent to solving the problem in Equation set (16):

$$\max_{p_j^{(k)}} \quad (p_j^{(k)})^T A_d^{(j)} p_j^{(k)} \tag{16}$$

$$\text{s.t.} \quad (p_j^{(k)})^T A_s^{(j)} p_j^{(k)} = 1$$

$$(p_j^{(k)})^T p_j^{(k-1)} = 0$$

$$\ldots$$

$$(p_j^{(k)})^T p_j^{(0)} = 0.$$

In one implementation, the iterative eigenvalue engine 228 obtains the solution by solving the following eigenvalue problem in Equation (17):

$$\tilde{M}_{p_j^{(k)}} = (\tilde{M}(A_s^{(j)})^{-1} A_d^{(j)}) p_j^{(k)} = \lambda p_j^{(k)} \tag{17}$$

where, in Equations (18), (19), and (20):

$$M = I - (A_s^{(j)})^{-1} A B^{-1} (A)^T \tag{18}$$

$$A = [p_j^{(0)}, p_j^{(1)}, \ldots, p_j^{(k-1)}] \tag{19}$$

$$B = [b_{uv}] = A^T (A_s^{(j)})^{-1} A \tag{20}$$

The optimal $p_i^{(k)*}$ is the eigenvector corresponding the largest eigenvalue of $\tilde{M}$.

Table 1 below summarizes the exemplary techniques iteratively executed by the learning engine 202, namely, exemplary orthogonal rank one tensor discriminant analysis. It too can only guarantee a locally optimal solution.

TABLE 1

Orthogonal Rank One Tensor Discriminant Analysis.

INPUT: $\{X_i\}_{i=1}^{N-1}$, S and D
OUTPUT: $\tilde{P}^K = (\tilde{P}^{(0)}, \tilde{P}^1, \ldots, \tilde{P}^{(K-1)})$
1. k = 0, iteratively solving Equation (15) over i = 0, 1,..., n − 1 to obtain $\tilde{P}^{(0)}$. k = k + 1
2. Randomly initialize each $p_i^{(k)}$ as a normal vector, randomly generate number j ∈ {l|l = 0,...,n − 1 & $m_l$ > k}
    a. For each i = [j,0,1...,j − 1,j + 1,...,n − 1], fixing all other $p_m^{(k)}$, m ≠ i. If i = j, update $p_i^{(k)}$ by solving Equation (17). Otherwise update $p_i^{(k)}$ by solving Equation (15). Then normalize $p_i^{(k)}$.
    b. Repeat Step 2a until the optimization of Equation (6) is converged to obtain $\tilde{P}^{(k)}$
3. k = k + 1. If k < K, repeat Step 2, else output $\tilde{P}^K = (\tilde{P}^{(0)}, \tilde{P}^1, \ldots, \tilde{P}^{(K-1)})$ There is no theoretic guidance on how to choose j in Equation (9). In one implementation, not too many constraints are placed on one specific dimension. Therefore the random dimension selector 234 chooses one dimension j when pursing each one of the K rank one projections.

Second, the orthogonality engine 226 performs the constrained optimization on $p_j^{(k)}$ first. This ensures that the constraints in Equation (7) hold in all the iterations.

Third, when k rank one projections have been obtained and $k \geq m_i$, then orthogonality constraints can no longer be imposed on the $i^{th}$ dimension. The reason is that $\{p_i^{(l)}|l=0, \ldots, k-1\}$ already span $R^{m_i}$; so only $m=\max\{m_i\}_{i=0}^{n-1}$ orthogonal rank one projections can be pursued. However, the tensor rearranger 218 can address this issue by transforming the tensor space from $R^{m_0 \times m_1 \cdots \times m_{n-1}}$ to $R^{m'_0 \times m'_1 \cdots \times m'_{n-1}}$, where $m'=\max\{m'_i\}_{i=0}^{n-1}$. In this new transformed space, the learning engine 202 can then find a maximum of m' rank one projections. For example, exploring second order tensors, a GLOCAL transform can be used in the tensor rearranger 218.

Figure 4:
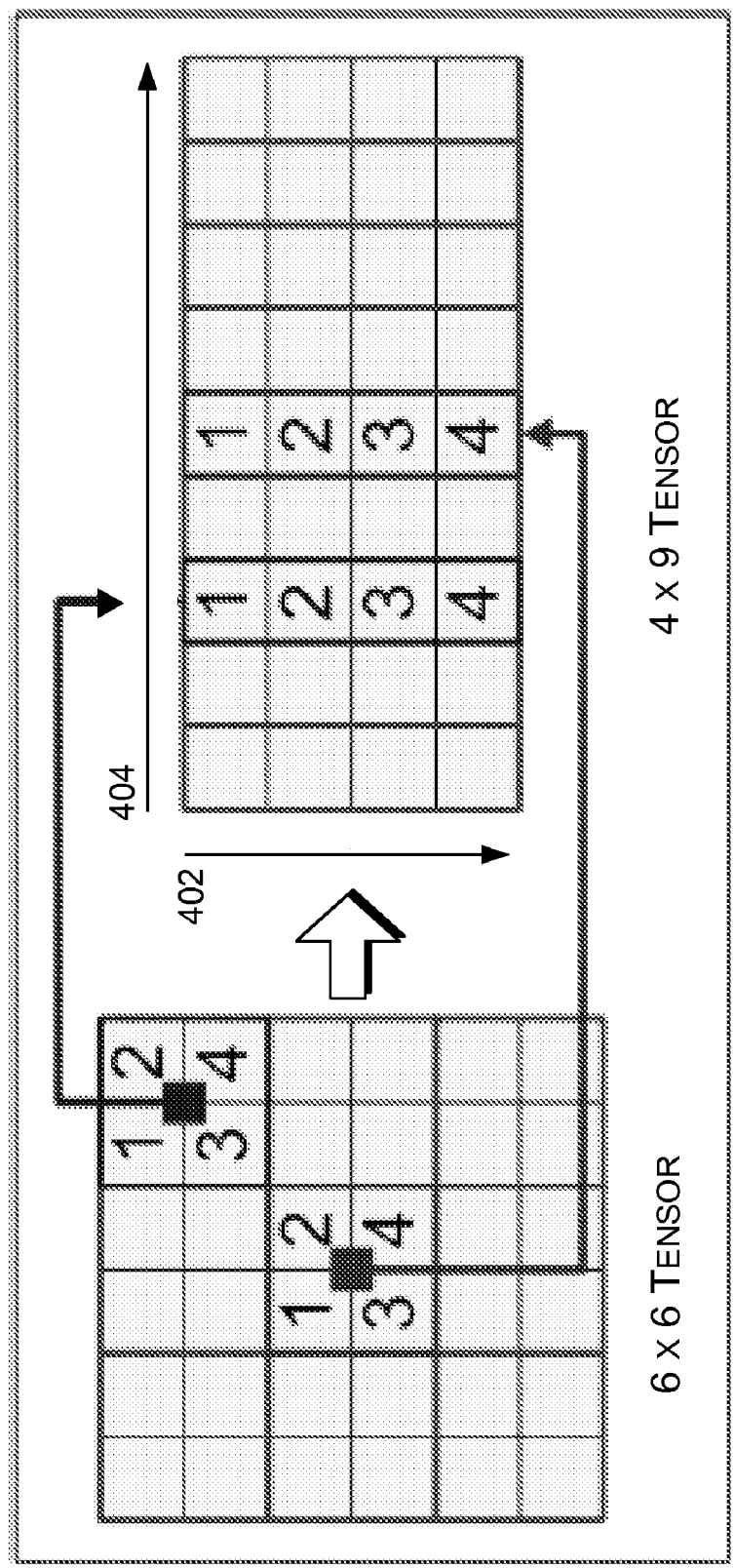
FIG. 4 is a diagram of exemplary tensor rearrangement.

FIG. 4 shows an example GLOCAL transform 400. The GLOCAL transform 400 partitions a tensor of size $m_0 \times m_1$ into $$m'_0 = \frac{m_0 \times m_1}{l_0 \times l_1}$$

non-overlapping blocks of size $l_0 \times l_1$. The blocks are ordered by a raster scan. Each block i is then itself raster scanned to be a vector of dimension $m'_1 = l_0 \times l_1$, and put into the $i^{th}$ column of the target tensor of size $m'_0 \times m'_1$. The GLOCAL transform 400 can be interpreted in the following manner: the column space 402 expresses local features in the pixel level, and the row space 404 expresses global features in the appearance level.

Effectiveness of Projections

Figure 5:
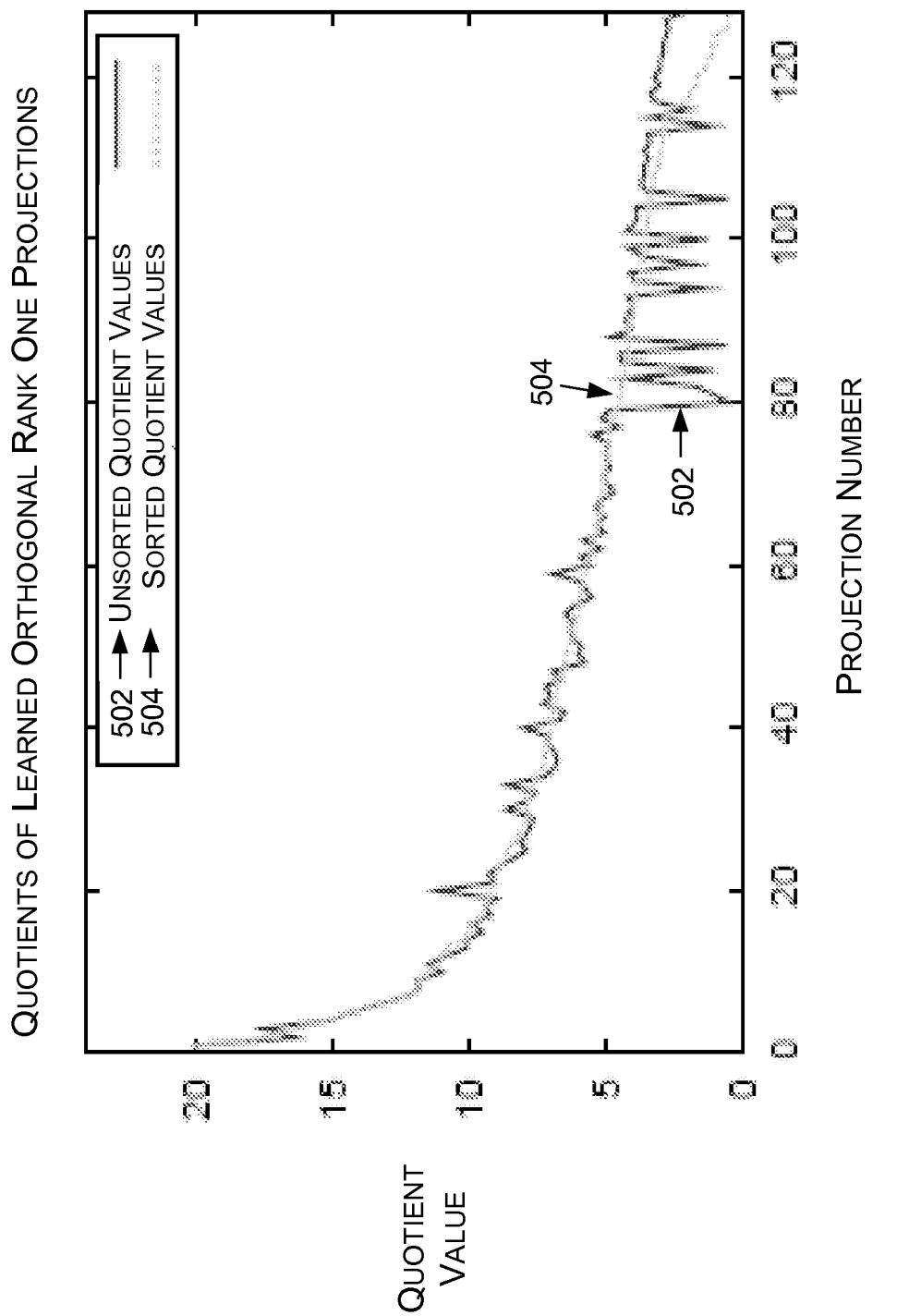
FIG. 5 is a diagram showing a discriminative ability of consecutively pursued orthogonal rank one tensor projections.

FIG. 5 shows the discriminative power of consecutively pursued orthogonal rank one tensor projections. The discriminant power (evaluated by the quotient Equation (6)) does not strictly decrease over the sequentially pursued projections. In order to explore the effectiveness of projections with varying dimensions, they are first sorted according to discriminant power. FIG. 5 displays the discriminant power of the orthogonal rank one projections obtained on a training set of images 106, such as the CMU Pose, Illumination, and Expression (PIE) benchmark database (Carnegie Mellon University, Pittsburgh, Pa.). Curve 502 shows the unsorted quotients, and curve 504 displays the sorted quotients. In one implementation, the learning engine 202 performs a GLOCAL transform with 4×2 blocks to form a tensor of size 8×128, allowing a total of 128 orthogonal projections.

Exemplary Method

Figure 6:
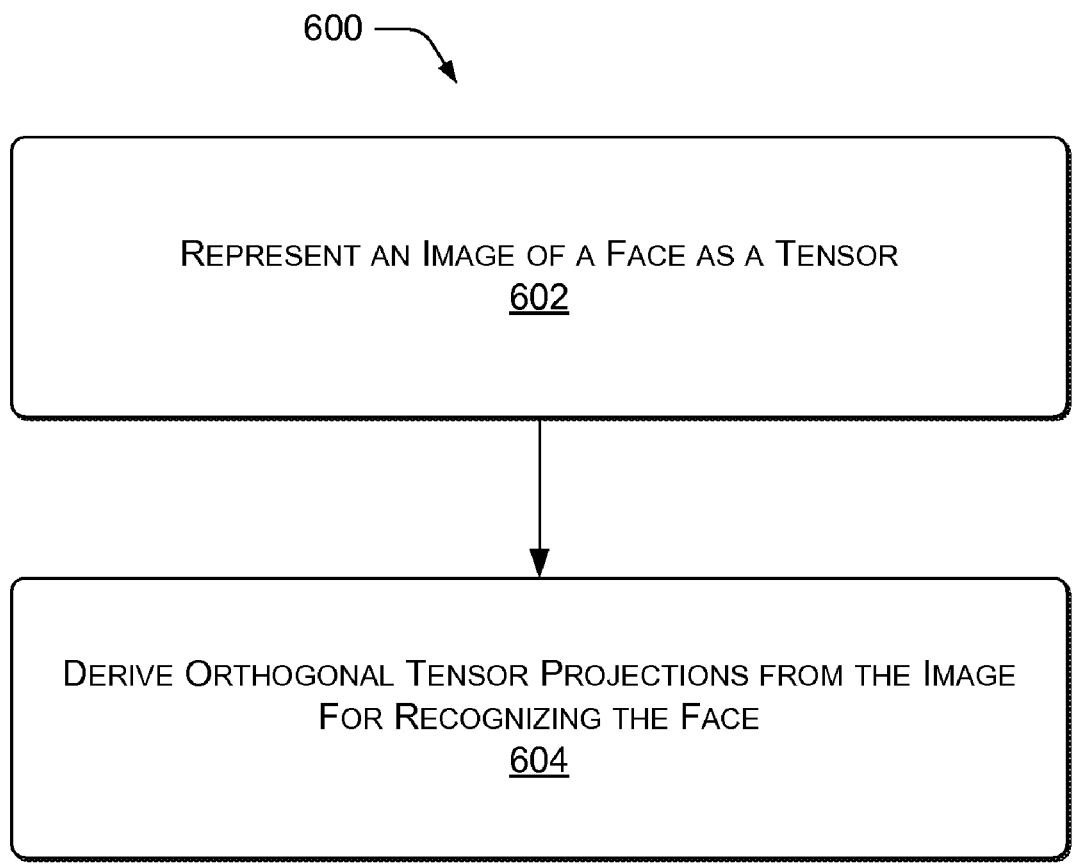
FIG. 6 is a flow diagram of an exemplary method of face recognition using orthogonal tensor projections.

FIG. 6 shows an exemplary method 600 of face recognition using orthogonal tensor projections. In the flow diagram, the operations are summarized in individual blocks. The exemplary method 600 may be performed by hardware, software, or combinations of hardware, software, firmware, etc., for example, by components of the exemplary face recognition engine 104.

At block 602, an image that includes a face is represented as a tensor. When images are treated as tensors, rather than as conventional vectors of pixels, optimal discriminant features can be extracted as discriminant multilinear projections. The discriminant multi-linear projections can be obtained by solving eigenvalue problems iteratively on n different dimensions of the tensor space.

At block 604, orthogonal tensor projections are derived from the image for recognizing the face, e.g., in other, different images. During runtime, the system "designs" the visual features on the fly—to be embodied as tensor projections—that minimize intraclass differences between instances of the same face while maximizing interclass differences between the face and faces of different people. In one implementation, tensor projections are pursued sequentially over a training set of images and take the form of a rank one tensor, i.e., the outer product of a set of vectors. An exemplary technique ensures that the tensor projections are orthogonal to one another, thereby increasing ability to generalize and discriminate image features over conventional techniques. Orthogonality among tensor projections can be maintained by iteratively solving an ortho-constrained eigenvalue problem in one dimension of a tensor while solving unconstrained eigenvalue problems in additional dimensions of the tensor.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   representing images as tensors; and
   deriving orthogonal tensor projections to characterize image features for recognizing a person's face across different images containing the person's face, each of the orthogonal tensor projections being orthogonal to a remainder of the orthogonal tensor projections, and the orthogonal tensor projections minimizing dissimilarities between different instances of the person's face and maximizing dissimilarities between the person's face and faces of other people.

2. The method as recited in claim 1, wherein the orthogonal tensor projections comprise a set of orthogonal rank one tensor projections.

3. The method as recited in claim 1, wherein the deriving the orthogonal tensor projections further includes learning the orthogonal tensor projections from a set of training images, wherein the set of training images portrays multiple faces and multiple instances of each face.

4. The method as recited in claim 3, further comprising:
   receiving a test image;
   scanning the test image for an associated orthogonal tensor projection;
   comparing the corresponding orthogonal tensor projection with the orthogonal tensor projections learned from the images in the training set of images, to categorize the test image.

5. The method as recited in claim 4, wherein the deriving further includes learning a set of orthogonal rank one projections to minimize, in a projective embedding space, distances between instances of the person's face across multiple images and maximize distances between the person's face and corresponding faces of other people across multiple images.

6. The method as recited in claim 1, wherein deriving the orthogonal tensor projections to recognize an image feature across different images includes extracting or deriving the image features from visual attributes of the image, wherein the visual attributes include pixel-level attributes and human perceptual-level attributes.

7. The method as recited in claim 1, wherein deriving the orthogonal tensor projections includes pursuing a consecutive projection in a complement space of previous projections.

8. The method as recited in claim 1, wherein deriving the orthogonal tensor projections further includes preserving an orthogonality among consecutively pursued tensor projections to increase abilities of a set of the orthogonal tensor projections to generalize and discriminate image features.

9. The method as recited in claim 8, wherein the preserving includes iteratively solving for an eigenvalue with orthogonality constraints on one dimension and solving for unconstrained eigenvalues on other dimensions.

10. The method as recited in claim 1, further comprising rearranging a tensor in order to achieve a higher number of orthogonal tensor projections.

11. The method as recited in claim 10, wherein the rearranging uses a global-local (GLOCAL) schema.

12. A system, comprising:
a processor;
memory communicatively coupled to the processor;
a face recognition engine stored in the memory and executable by the processor to represent faces in images as orthogonal rank one tensor projections, each of the orthogonal rank one tensor projections comprising a Kronecker product of column vectors thereof being orthogonal to a Kronecker product of column vectors of any of the orthogonal rank one tensor projections; and
a learning engine in the face recognition engine to learn a set of the orthogonal rank one tensor projections from a set of training images in order to differentiate faces.

13. The system as recited in claim 12, wherein the learning engine includes a feature derivation engine to extract an image feature for differentiating faces via the orthogonal rank one tensor projections.

14. The system as recited in claim 12, wherein the learning engine includes a sequential projection generator for consecutively pursuing orthogonal tensor projections in a complement space of previous projections.

15. The system as recited in claim 12, wherein the learning engine includes a discriminative efficacy optimizer to learn the set of the orthogonal rank one tensor projections from the set of training images, the set of the orthogonal rank one tensor projections minimizing dissimilarities between different instances of a person's face across multiple images and maximizing dissimilarities between the person's face and faces of other people across multiple images.

16. The system as recited in claim 15, wherein the learning engine includes an orthogonality engine to maintain orthogonality between consecutively pursued tensor projections in order to increase abilities of a set of the orthogonal tensor projections to generalize and discriminate image features.

17. The system as recited in claim 16, wherein the orthogonality engine includes an eigenvalue engine to maintain the orthogonality by iteratively solving for an ortho-constrained eigenvalue in one dimension of a tensor and by iteratively solving for unconstrained eigenvalues in other dimensions of the tensor.

18. The system as recited in claim 12, further comprising a tensor rearranger to achieve a higher number of orthogonal tensor projections.

19. A method comprising:
under control of one or more processors configured with executable instructions to perform acts comprising:
representing images as tensors; and
discriminating faces in the images via orthogonal tensor projections, wherein an orthogonality among the orthogonal tensor projections is maintained by iteratively solving an ortho-constrained eigenvalue problem in one dimension of a tensor and solving one or more unconstrained eigenvalue problems in one or more other dimensions of the tensor.

20. The method as recited in claim 19, wherein the orthogonal tensor projections minimize, in a projective embedding space, distances between instances of a person's face across the images and maximize distances between the person's face and faces of other people across the images.

* * * * *

UNITED STATES PATENT AND TRADEMARK OFFICE
CERTIFICATE OF CORRECTION

PATENT NO. : 7,936,906 B2
APPLICATION NO. : 11/763909
DATED : May 3, 2011
INVENTOR(S) : Gang Hua et al.

It is certified that error appears in the above-identified patent and that said Letters Patent is hereby corrected as shown below:

In column 9, line 4, after " $m^t = \max\{m^t_i\}_{i=0}^{n-1}$ " insert -- $> m = \max\{m_i\}_{i=1}^{n-1}$ --.

Signed and Sealed this
Twelfth Day of July, 2011

David J. Kappos
*Director of the United States Patent and Trademark Office*